United States Patent
Mukai

(10) Patent No.: US 7,081,973 B2
(45) Date of Patent: Jul. 25, 2006

(54) FACSIMILE MACHINE AND FACSIMILE COMMUNICATIONS METHOD

(75) Inventor: Hirokazu Mukai, Tokyo (JP)

(73) Assignee: NEC Corporation, Tokyo (JP)

( * ) Notice: Subject to any disclaimer, the term of this patent is extended or adjusted under 35 U.S.C. 154(b) by 969 days.

(21) Appl. No.: 10/076,477

(22) Filed: Feb. 19, 2002

(65) Prior Publication Data
US 2002/0114018 A1 Aug. 22, 2002

(30) Foreign Application Priority Data
Feb. 20, 2001 (JP) ............................. 2001-042638

(51) Int. Cl.
*H04N 1/00* (2006.01)
(52) U.S. Cl. ..................... 358/440; 358/434; 358/409; 370/252; 379/100.17
(58) Field of Classification Search ................ 358/405, 358/434, 400, 440, 409; 370/252, 100.17; 375/242, 222; 379/100.17
See application file for complete search history.

(56) References Cited

U.S. PATENT DOCUMENTS

| | | | | |
|---|---|---|---|---|
| 5,173,786 A | * | 12/1992 | Nakagawa | ................... 358/405 |
| 5,995,242 A | * | 11/1999 | Izumisawa et al. | ......... 358/434 |
| 6,122,072 A | * | 9/2000 | Matsui et al. | ................ 358/434 |
| 6,426,946 B1 | * | 7/2002 | Takagi et al. | ................ 370/252 |
| 6,504,919 B1 | * | 1/2003 | Takagi et al. | ........... 379/100.17 |
| 6,574,280 B1 | * | 6/2003 | Liau et al. | ................... 375/242 |
| 2002/0154685 A1 | * | 10/2002 | Olafsson | ...................... 375/222 |

FOREIGN PATENT DOCUMENTS

JP 10-136112 5/1998

* cited by examiner

*Primary Examiner*—Kimberly Williams
*Assistant Examiner*—Ashish K Thomas
(74) *Attorney, Agent, or Firm*—Sughrue Mion, PLLC

(57) ABSTRACT

A facsimile machine is provided that can shorten a time period required for a pre-transmission procedure through simple manipulation, thus improving the transmission efficiency. Moreover, a facsimile communications method using the facsimile machine is provided. When initial facsimile transmission is performed to an opposite party of which a number is registered corresponding to at least one of abbreviated dialing and one-touch dialing, a partial step of a pre-communication procedure is stored in correspondence with the registered number. In the second or later communications to the registered number, a stored content is read out. Then, by allocating the stored content to said partial step, a required communication time period is shortened. The facsimile machine has a memory that stores number information on abbreviated dialing and/or one-touch dialing and required information corresponding to the number information.

8 Claims, 8 Drawing Sheets

FACSIMILE MACHINE AND FACSIMILE COMMUNICATIONS METHOD

BACKGROUND OF THE INVENTION

The present invention relates to a facsimile machine and a facsimile communications method. More particularly, the present invention relates a facsimile machine and a facsimile communications method, capable of shortening the time period required for a pre-transmission procedure when information is transmitted to a facsimile receiver with communication logs.

Usually, the V.34 mode used in communications by facsimile machines is implemented in accordance with the T.30 procedure abided by the ITU-T (International Telecommunications Union-Telecommunications) recommendation. In the communication procedure in accordance with the T.30 procedure, the mode is changed to the primary channel sequence for image data communications through call connection, the V.8 sequence in an initial identification phase, the line probing sequence of measuring line characteristics and then determining a symbol rate, the equalizer training sequence of optimizing the equalizer of a receiving modem, data rate detection, and the control channel sequence of exchanging parameters of mutual devices.

In the V.34 mode, the modem must be optimized to the line characteristics to transmit image data at a high-speed data rate of up to 33.6 kbps. This requires the above-mentioned long procedure.

However, the long sequence until the mode reaches the image data transmission prolongs the total communication time even if the image data sequence is sped up. The user cannot be recognized the effect of the high rate operation.

Moreover, when communications is again tried to the party which has been once communicated, repeating the line status such as line probing is not required because the symbol rate and the data rate for appropriate communication are already known. However, in the normal V.34 mode, repeating the same sequence every time communications are established leads to wasting a very large time.

JP-A No. 136112/1999 discloses the prior art of shortening the time period required for the pre-procedure in data communications using a modem including a facsimile machine. In compliance with the communications standards T.30 ANNEX F (the so-called super G3) for facsimile using the V.34, the pre-procedure time for setting modem parameters, an optimum training time, a modulation mode, and the like is prolonged whereby the communication efficiency is decreased. That prior art proposes to improve such a problem.

Moreover, according to the above-mentioned prior art, the telephone number and the modem parameters of an opposite party, an optimum training time, and a modulation mode are stored in a one-to-one correspondence with each other in a memory. The sets of information are read out in response to a telephone number input from the transmission side and the communication procedure is executed. Thus, by omitting the pre-procedure, the communication time can be shortened. In this case, the user has to previously register each set of data as an abbreviated procedure into the memory. It is troublesome to store the modem parameters, the optimum training time, the modulation mode, and the like, except the telephone number of a transmission destination. The user is required to handle the facsimile machine skillfully.

SUMMARY OF THE INVENTION

The present invention is made to solve the above-mentioned problems in the prior art related to facsimile machines based on the T.30 procedure in compliance with the ITU-T.

An object of the present invention is to provide a facsimile machine capable of shortening the time period required for a pre-transmission procedure through an operation as simple as possible and improving the transmission efficiency.

Another object of the present invention is to provide a facsimile communications method using the facsimile machine.

In order to accomplish the above-mentioned objects, a facsimile communications method comprises the steps of storing, when initial facsimile transmission is performed to an opposite party of which a number is registered corresponding to abbreviated dialing, a partial step of a pre-communication procedure in correspondence with the registered number; and reading out a stored content in the second or later communications to the recorded number and then allocating said content to the partial step, thus shortening a required communication time period.

In another aspect of the present invention, a facsimile communications method comprises the steps of storing, when initial facsimile transmission is performed to an opposite party of which a number is registered corresponding to one-touch dialing, a partial step of a pre-communication procedure in correspondence with the registered number; and reading out a stored content in the second or later communications to the recorded number and then allocating said content to the partial step, thus shortening a required communication time period.

In the facsimile communications method, the partial step comprises a V.8 sequence in an initial identification phase.

In the facsimile communications method, the partial step comprises a line probing sequence.

In the facsimile communications method, the partial step comprises an equalizer training sequence.

In the facsimile machine of the present invention, when communications is conducted to an opposite party which has been once communicated and which is registered for abbreviated dialing or one-touch dialing, part of the V.8 sequence, the line probing sequence, and the equalizer training sequence are omitted. Hence, the facsimile machine can shorten the entire communications time.

In the facsimile communications method of the present invention, because the tone signal is sent with the ANSam timing of the V.8 sequence, the portions CM/JM/CJ of the V.8 sequence are omitted. Moreover, because the existing line characteristics and the previous symbol rate are known, the line probing sequence is omitted by using the previous symbol rate. Moreover, because the previous data rate has already known, re-training is unnecessary.

As a result, the equalizer training sequence can be cut. Since the previous symbol rate is sent from the transmitter side to the receiver side based on the type of a tone signal sent to ANSam, both the transmitter and the receiver share the information. Moreover, the previous data rate is notified the control channel.

In such an operation, when facsimile transmission is conducted to an opposite party of which the number is registered for at least one of abbreviated dialing and/or one-touch dialing, a partial step in a pre-communication procedure is automatically stored in correspondence with the registered number. When the second or later communications is conducted to the registered number, the stored contents are read out and used as the part of the pre-communication procedure.

Therefore, the facsimile machine can largely shorten the communication time required in the pre-communication procedure and can rapidly change the operation to facsimile information (image signals) communications, thus improving the facsimile communication efficiency. As a matter of course, this system can improve the line use efficiency and can reduce the busy state to calling from other communication parties.

BRIEF DESCRIPTION OF THE DRAWINGS

This and other objects, features and advantages of the present invention will become more apparent from the following detailed description taken in conjunction with the attached drawings, in which.

DESCRIPTION OF THE EMBODIMENTS

Figure 1:
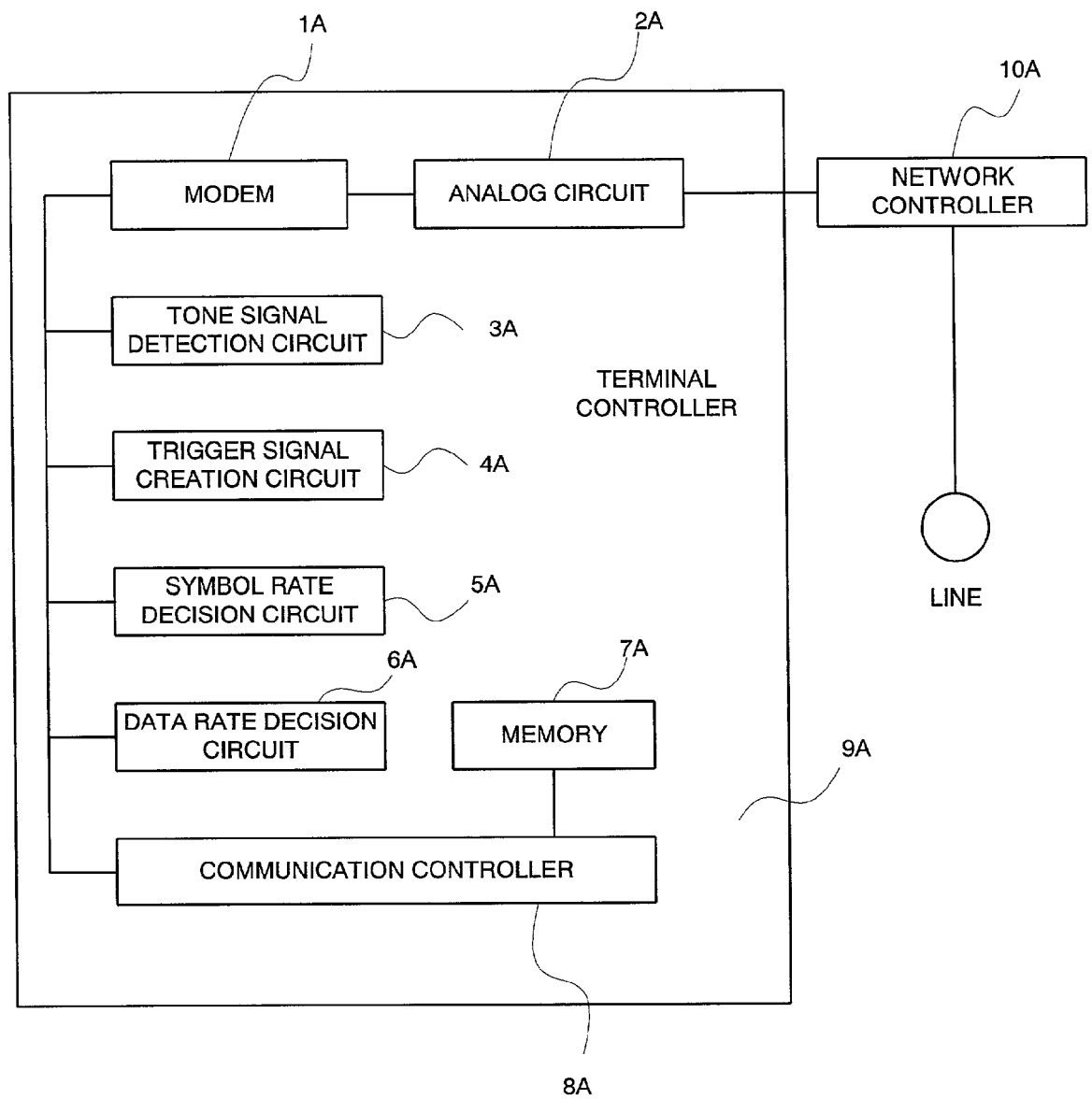
FIG. 1 is a block diagram illustrating the configuration of a facsimile machine according to the present invention.

The configuration of a facsimile machine according to the present invention will be described below by referring to the attached drawings. FIG. 1 is a block diagram illustrating the configuration of a facsimile machine of the present invention. This system includes a terminal controller 9A for implementing functions necessary for facsimile transmission/reception and a network controller 10A acting as an interface to a line.

The terminal controller 9A consists of a modem 1A for modulating and demodulating in communications; an analog circuit 2A for adjusting a modulated/demodulated signal to a signal level suitable for transmission/reception; a tone signal detection circuit 3A for detecting a tone signal which cuts a procedure; a trigger signal creation circuit 4A for creating a tone signal which cuts a procedure; a symbol rate decision circuit 5A for deciding a symbol rate suitable for communications in transmission and deciding a symbol rate to be communicated based on a signal type detected by the tone signal detection circuit in reception; a data rate decision circuit 6A for deciding whether or not at what data rate communications is conducted; a communication controller 8A for controlling whole communications; and a memory 7A for storing information on abbreviated dial numbers and/or one-touch dial numbers and required information in correspondence with the number information.

Figure 2:
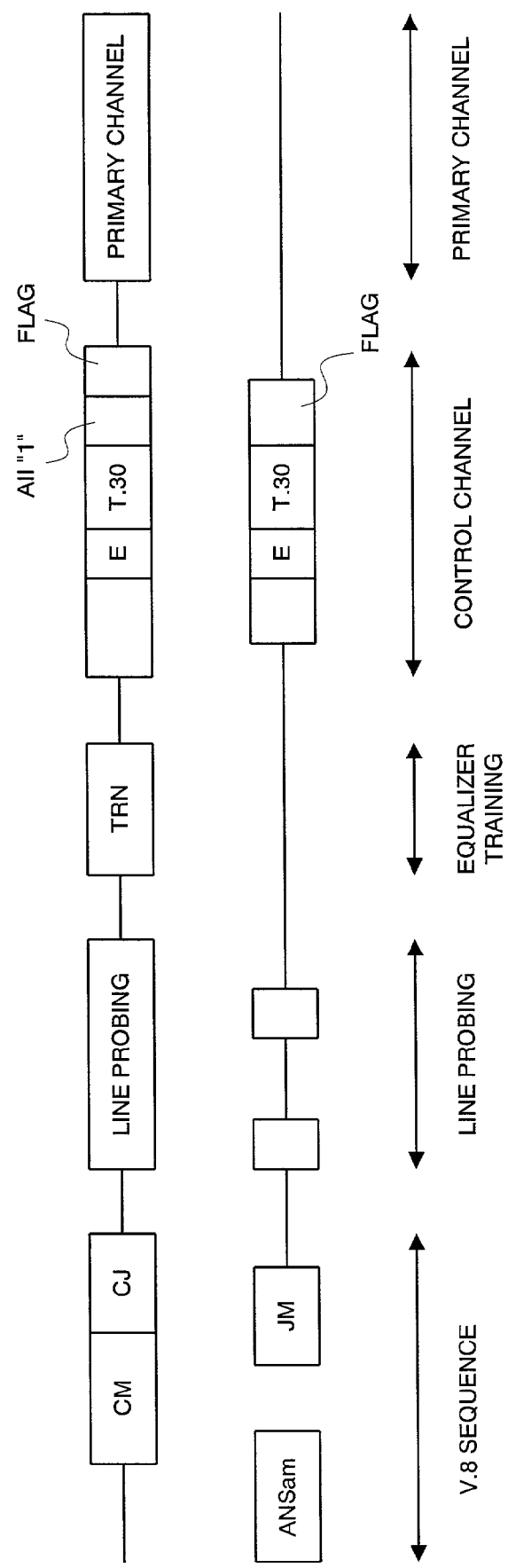
FIG. 2 is a sequence chart for the fundamental system of a facsimile communications method according to the present invention.

FIG. 2 is a sequence chart illustrating a communication sequence of the normal V.34 mode specified in the T.30.

Figure 3:
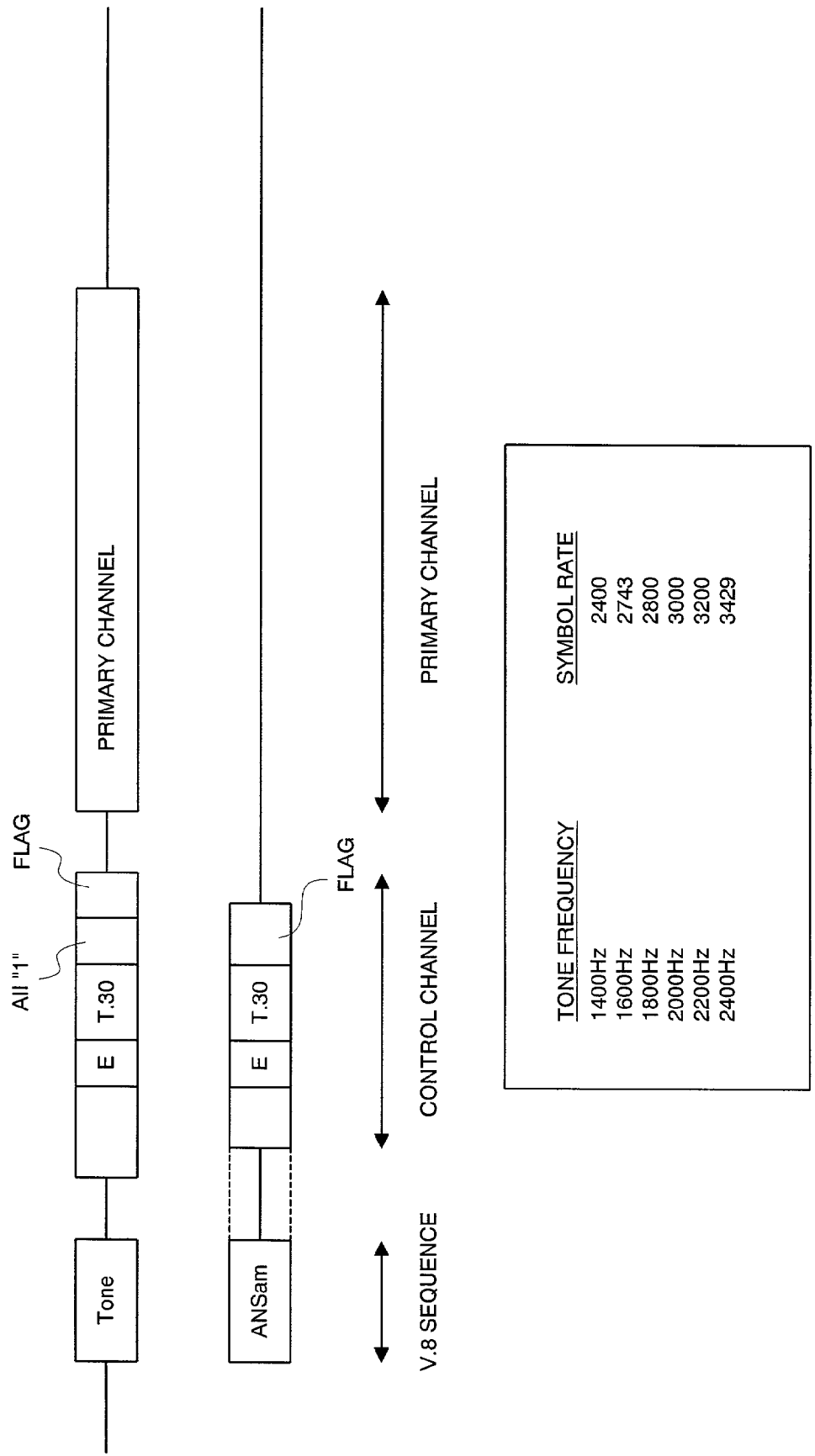
FIG. 3 is an improved sequence chart in the facsimile communications method according to the present invention.

FIG. 3 is a sequence chart illustrating an abbreviated procedure executed in the facsimile communications method of the present invention. In FIG. 3, part of the V.8 sequence, the line probing sequence, and the equalizer training are omitted.

FIG. 2 shows a communication sequence in a conventional V.34 mode. The V.34 mode sequence will be now briefly explained. There is the V.8 sequence in an initial identification phase. It is ascertained whether or not a transmission terminal and a receiving terminal have the V.34 mode. When the transmission terminal and the receiving terminal have the V.34 mode in the V.8 sequence, the mode advances to the line probing sequence. In the line probing, the line characteristics are measured and the symbol rate is determined based on the measurement result.

There are symbol rates of six types including 3429, 3200, 3000, 2800, 2743, and 2400. One of six symbols is selected. In the next equalizer training sequence, training is performed using the symbol rate determined in the line probing sequence to optimize the equalizer in the primary channel. The control channel roughly has two functions. The first function determines the data rate used in the primary channel before the E sequence. The data rate is determined based on the line probing result and the equalizer training result. The data rate ranges from 2400 bps to 33600 bps and is set at intervals of 2400 bps. In decision process, both the transmitter and the receiver transmit the set data rate information to each other and select a low data rate.

In the second function, the control channel exchanges information regarding two terminals called the T.30 phase. Here, the control channel exchanges the same information as that in the phase B executed in communications less than V.17. In the control channel, information is exchanged at a signal of 1200 bps. In order to end the control channel, the transmitter transmits information in which all of 40 bits or more are "1". When receiving the all "1" information, the receiver halts transmission of a flag. When detecting that the flag from the receiver has stopped, the transmitter stops transmitting the flag. Thus, the control channel is ended. Next, the mode advances to the primary channel sequence in which image signals are communicated.

Figure 4:
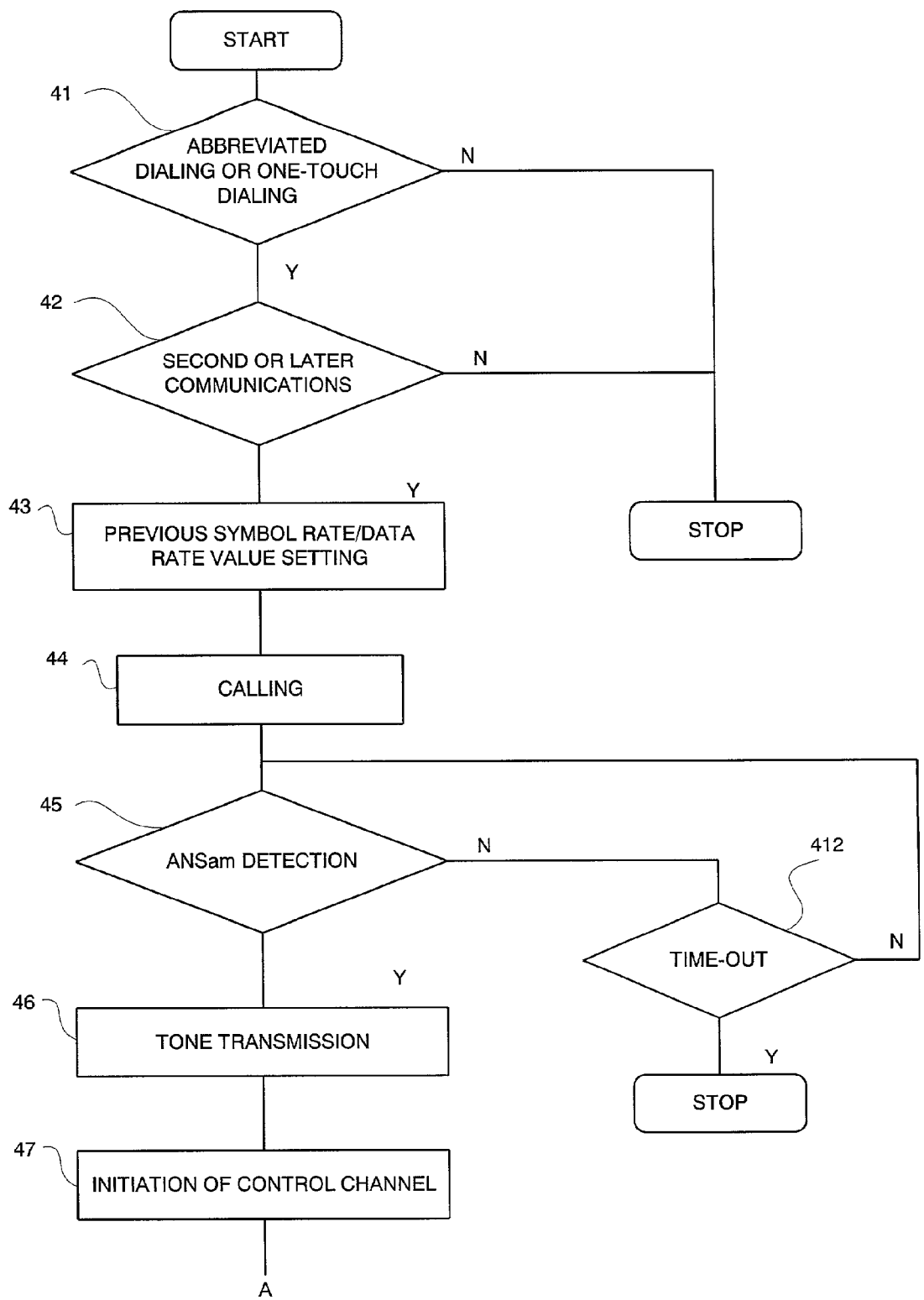
FIG. 4 is a flowchart illustrating an operation on the transmission side according to an embodiment of the present invention.
Figure 5:
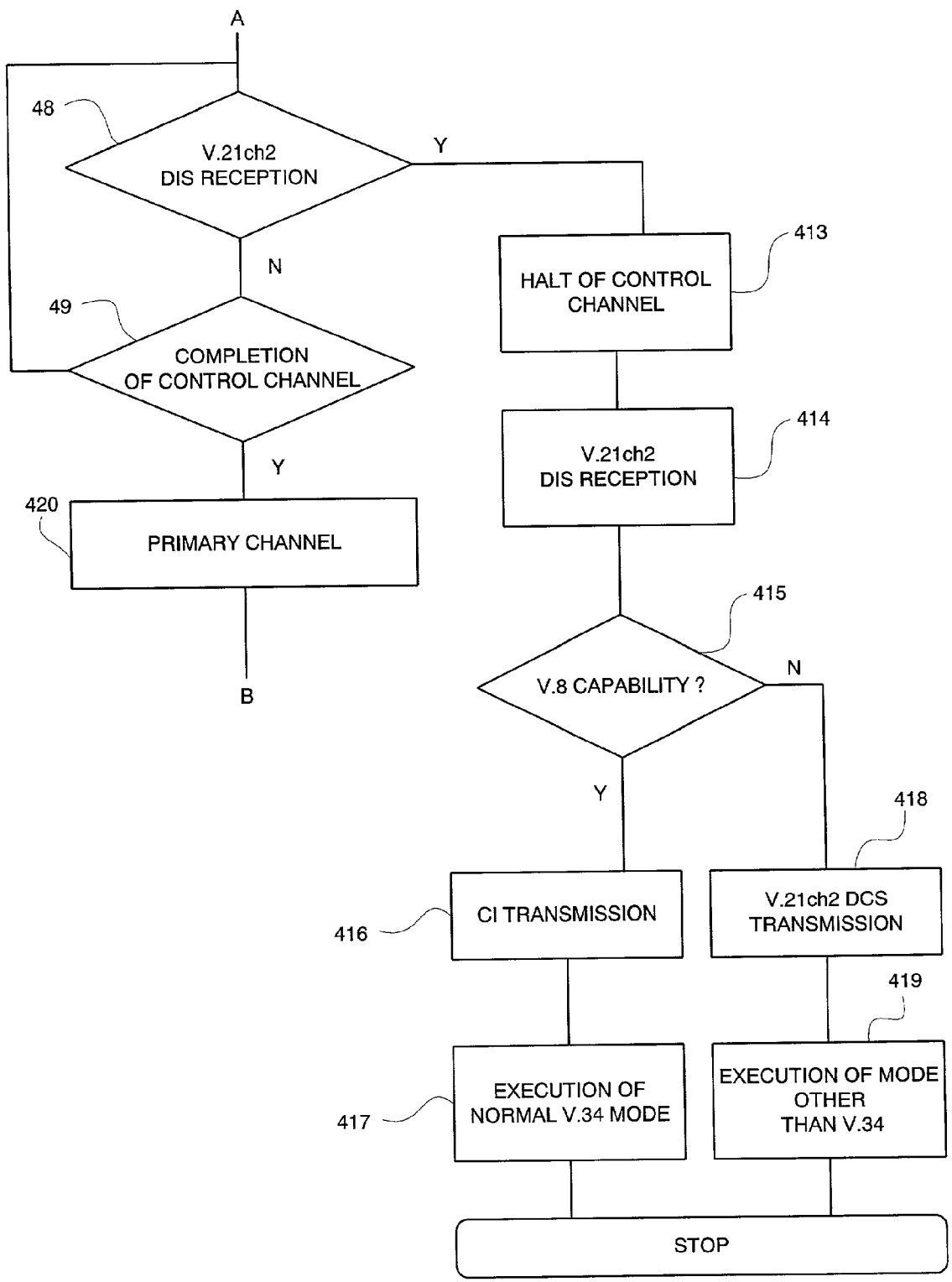
FIG. 5 is a flowchart illustrating an operation on the transmission side according to an embodiment of the present invention.
Figure 6:
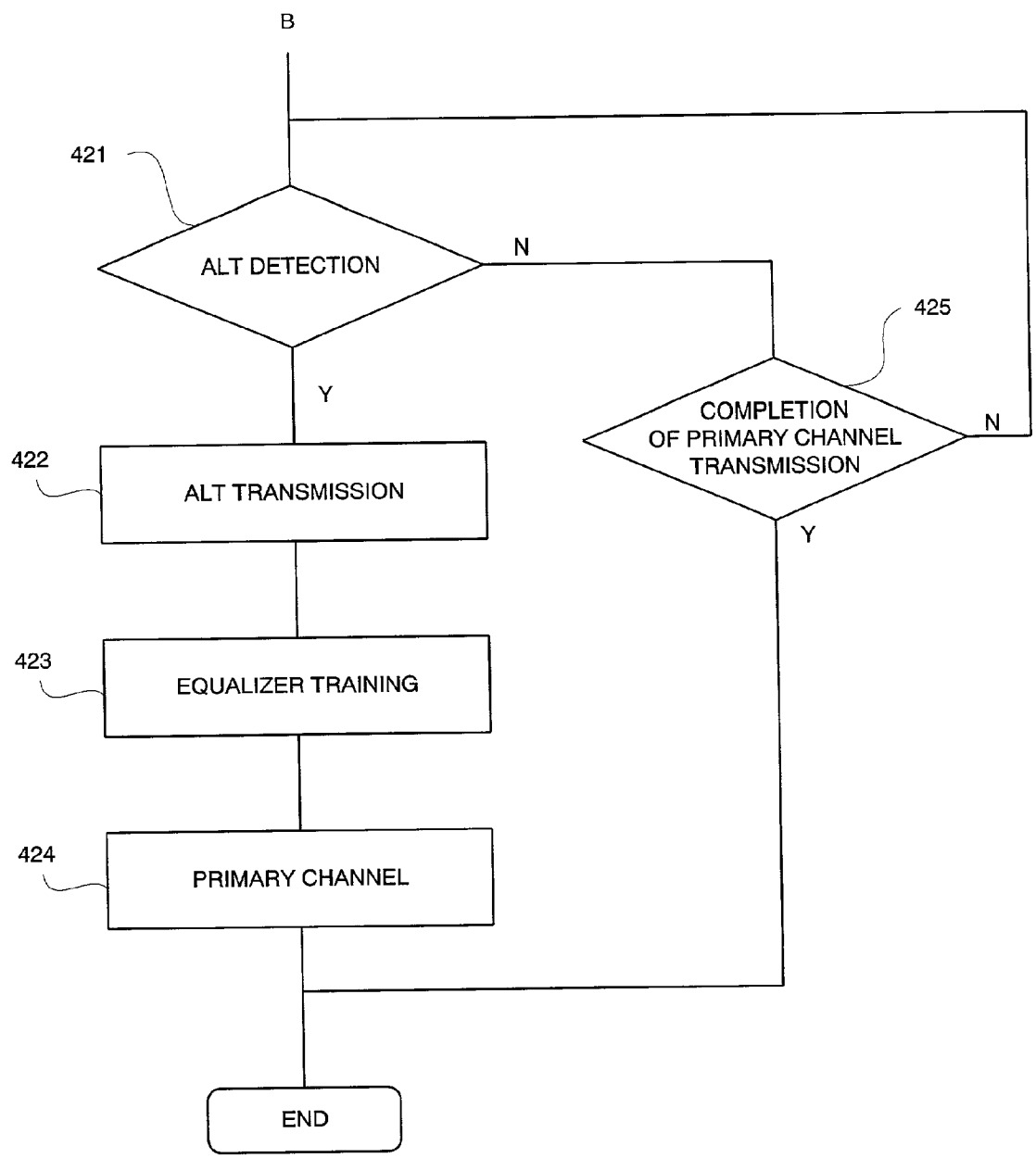
FIG. 6 is a flowchart illustrating an operation on the transmission side according to an embodiment of the present invention.
Figure 7:
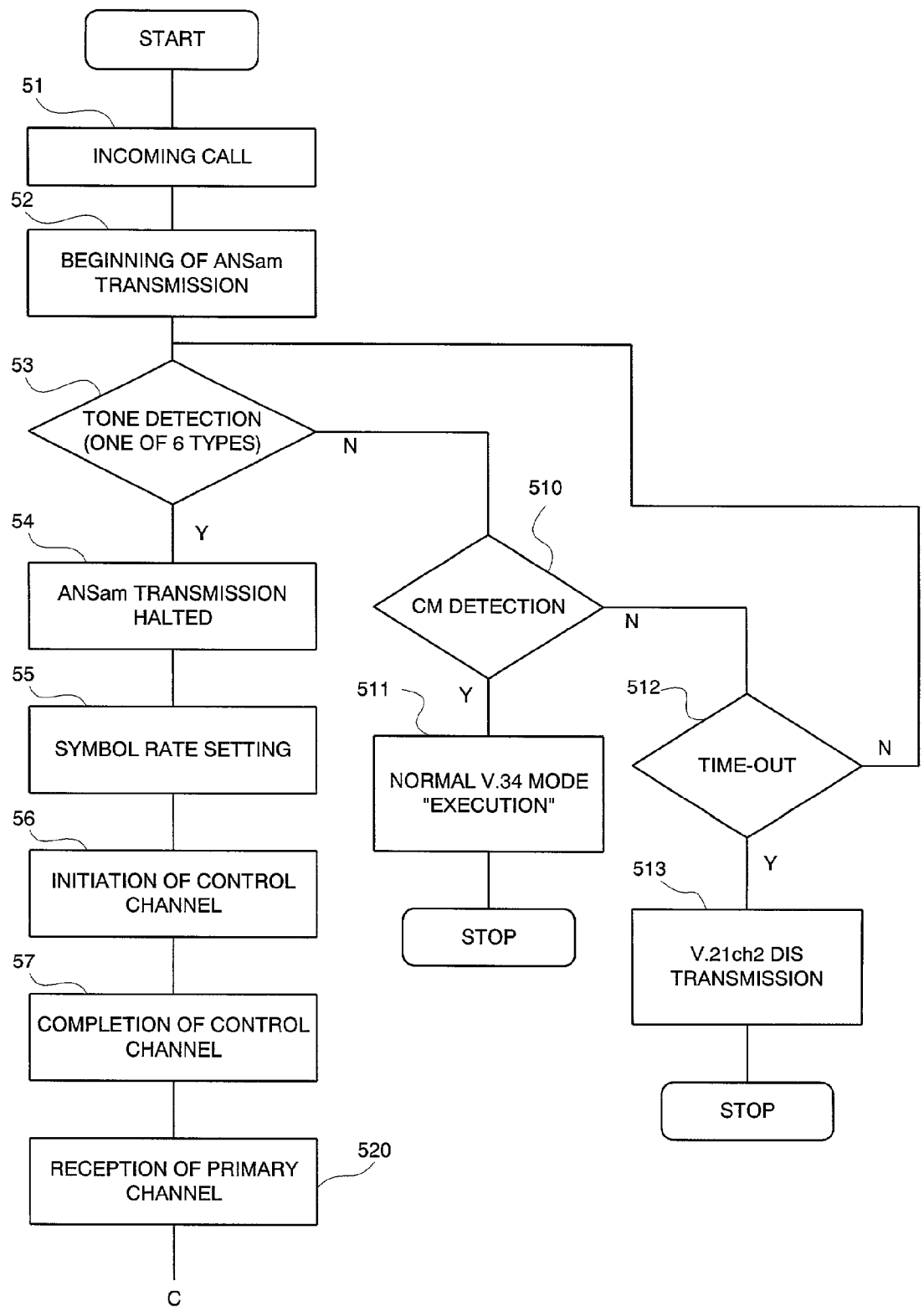
FIG. 7 is a flowchart illuminating an operation on the reception side according to an embodiment of the present invention.
Figure 8:
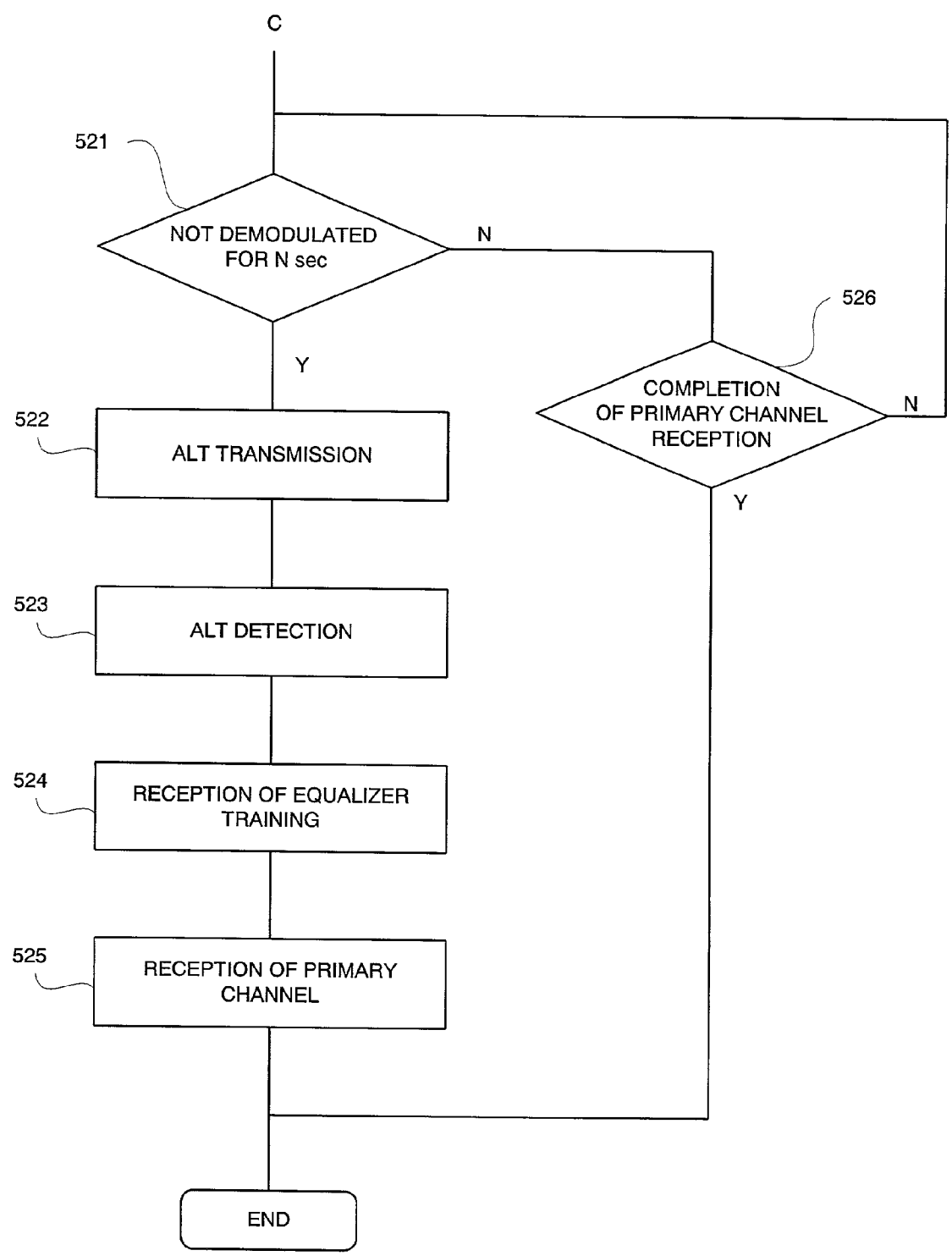
FIG. 8 is a flowchart illuminating an operation on the reception side according to an embodiment of the present invention.

FIG. 3 is a sequence chart according to the present invention. Each of FIGS. 4 to 6 shows an operational flow of the transmitter side. Each of FIGS. 7 and 8 shows an operational flow of the receiver side. The operation of a facsimile communications method of the present invention will be described below by referring to FIG. 1 and FIGS. 4 to 8. First, the transmitter performs dialing and judges whether or not the dialing is registered in number as abbreviated dialing or one-touch dialing (step 41). The dialing, except for the abbreviated dialing and the one-touch dialing, is registered, the mode is escaped from the operational flow.

In the abbreviated dialing or one-touch dialing, it is judged whether or not the current communication is the second one or later (step 42). If the current communication is the first one, the mode is escaped from the operational flow because there are not symbol rate information and data rate value information. If the current communication is the second one or later, both the symbol rate and the data rate value set in the previous communication are set (step 43). In the first communication, the symbol rate and the data rate value are stored in the memory 7A. Both the symbol rate decision circuit 5A and the data rate decision circuit 6A read out information from the memory 7A and set various circuits.

Next, calling is originated (step 44). After the calling, when the transmitter is connected to the receiver, the ANSam signal is transmitted from the receiver side. In the transmitter, the modem 1A detects the ANSam signal. When the ANSam signal is detected (step 45), the trigger signal (tone signal) creation circuit 4A immediately transmits the tone signal (step 46). There are at least tone signals of six types. The symbol rate used in the later communications is reported with the frequency of a tone signal. The relationships between the frequency and the symbol rate are shown in FIG. 3. The receiver stops the transmission of the ANSam signal in response to the tone signal.

After the transmitter transmits the tone signal, the mode changes to the transmission of a control channel (step 47). When the DIS signal of the V.21ch2 comes in response to the transmission of the control channel from the transmitter (step 48), the transmitter halts the transmission of the control channel (step S413), so that the DIS signal is received (step 414). In this case, it is judged that the receiver does not have the function according to the present invention. Thus, the mode is changed to the manual sequence in the normal V.34 mode. The mode may be changed to a mode other than the V.34 mode.

When the DIS signal of the V.21ch2 does not come, the control channel communications are continued. In the control channel communications, the data rate value information set in the data rate decision circuit 6A is sent out so that the data rate is determined. When the control channel is completed (step 49), an image signal is transmitted in the primary channel (step 420). The ALT signal is the signal defined as a sequence recovery trigger signal in the V.34 mode.

In this invention, because the data rate is known, the equalizer training sequence is omitted. However, because of changes in the line status, communications may not be normalized in the previous equalizer status. In such a case, the recovery sequence is triggered with an ALT signal sent out from the receiver side. When the ALT signal is not detected, completion of the primary channel transmission is monitored (step 425). If the primary channel transmission is not completed, the flow returns to the ALT-detection checking mode (step 421).

When the ALT signal is received, the transmission side issues it (step 422). Thus, the beginning of the recovery sequence is matched. Next, the equalizer training is implemented (step 423) and the primary channel is again transmitted (step 424).

Next, the operational flow of the receiver side will be described below by referring to FIGS. 7 and 8. An incoming call by a ringer signal occurs on the receiver side (step 51). Thereafter, the ANSam signal is sent out (step 52). When the tone signal is received during the transmission of the ANSam signal (step 53), the ANSam signal is immediately ceased from being transmitted (step 54). The tone signal detection circuit 3A detects the tone signal.

The symbol rate is determined based on the frequency of the tone signal and the symbol rate value is set (step 55). Both the judgement and the setting are performed with the symbol rate decision circuit 5A. Thereafter, the control channel initiates (step 56). The control channel determines the data rate. Then, the control channel is completed (step 57). Thereafter, an image signal is received by receiving the primary channel (step 520).

Subsequently, whether or not the primary channel has been demodulated is checked (step 521). When the demodulation cannot be performed in N seconds, the ALT signal is transmitted (step 522). When the ALT signal from the transmission side is detected (step 523), the mode becomes an equalizer training reception state (step 524). Thereafter, the primary channel is again received (step 525).

When the primary channel is normally demodulated, the completion of the primary channel reception is continuously monitored (step 526).

Next, another embodiment of the present invention will be described below. In this embodiment, the symbol rate is notified using a tone signal transmitted to the ANSam signal. Thus, the line probing sequence is omitted. The data rate is matched in the control channel. However, in this step, by using a dual tone as the tone signal, both the information on the symbol rate and the information on the data rate can be sent to the receiver side. As a result, the data rate is completely matched in the control channel. The portion before the E sequence of the control channel can be omitted.

According to the facsimile machine and the facsimile communications method of the present invention, when communications is conducted to the party that has been once communicated and registered for abbreviated dialing or one-touch dialing, the information automatically stored in the first communication time is used. Thus, communications are conducted by omitting part of the V.8 sequence, the line proving sequence, and the equalizer training sequence so that the whole communication time is abbreviated. Particularly, this effect is remarkable in the broadcast communication and fixed time communication. Omission of part of the pre-communication procedure allows the communication time to be reduced. Hence, the communication costs depending on the communication time can be reduced. Moreover, the transmission waiting time and the re-originating call can be effectively reduced.

The entire disclosure of Japanese Application No. 2001-042638 on Feb. 20, 2001 including specification, claims, drawings and summary are incorporated herein by reference in its entirely.

What is claimed is:

1. A facsimile communications method comprising:
   storing, when initial facsimile transmission is performed to an opposite party of which a number is registered corresponding to abbreviated dialing, a partial step of a pre-communication procedure in correspondence with the registered number;
   reading out a stored content in a second or later communications to the registered number; and
   allocating said content to said partial step,
   wherein said partial step comprises a V.8 sequence in an initial identification phase.

2. The method defined in claim 1, wherein said partial step further comprises a line probing sequence.

3. A facsimile communications method comprising:
   storing, when initial facsimile transmission is performed to an opposite party of which a number is registered corresponding to abbreviated dialing, a partial step of a pre-communication procedure in correspondence with the registered number;
   reading out a stored content in a second or later communications to the registered number; and
   allocating said content to said partial step,
   wherein said partial step comprises an equalizer training sequence.

4. A facsimile communications method comprising:
storing, when initial facsimile transmission is performed to an opposite party of which a number is registered corresponding to one-touch dialing, a partial step of a pre-communication procedure in correspondence with the registered number; and
reading out a stored content in a second or later communications to the registered number; and
allocating said content to said partial step,
wherein said partial step comprises a V.8 sequence in an initial identification phase.

5. The method defined in claim 4, wherein said partial step further comprises a line probing sequence.

6. A facsimile communications method comprising:
storing, when initial facsimile transmission is performed to an opposite party of which a number is registered corresponding to one-touch dialing, a partial step of a pre-communication procedure in correspondence with the registered number; and
reading out a stored content in a second or later communications to the registered number; and
allocating said content to said partial step,
wherein said partial step comprises an equalizer training sequence.

7. The method defined in claim 3, wherein said partial step further comprises a line probing sequence.

8. The method defined in claim 6, wherein said partial step further comprises a line probing sequence.

* * * * *